United States Patent
Regelski et al.

(10) Patent No.: US 6,738,772 B2
(45) Date of Patent: May 18, 2004

(54) ACCESS CONTROL SYSTEM HAVING AUTOMATIC DOWNLOAD AND DISTRIBUTION OF SECURITY INFORMATION

(75) Inventors: Michael Regelski, Rochester, NY (US); Rudy Prokupets, Rochester, NY (US); John Yuan, Pittsford, NY (US)

(73) Assignee: Lenel Systems International, Inc., Pittsford, NY (US)

( * ) Notice: Subject to any disclaimer, the term of this patent is extended or adjusted under 35 U.S.C. 154(b) by 0 days.

(21) Appl. No.: 09/135,822

(22) Filed: Aug. 18, 1998

(65) Prior Publication Data

US 2002/0077996 A1 Jun. 20, 2002

(51) Int. Cl.[7] .............................................. G06F 17/30
(52) U.S. Cl. ............................................. 707/10; 707/9
(58) Field of Search ............................. 707/201, 10, 9, 707/200, 107; 235/382, 380; 340/825.31; 713/200

(56) References Cited

U.S. PATENT DOCUMENTS

| | | | |
|---|---|---|---|
| 4,216,375 A | 8/1980 | Ulch et al. | 235/382 |
| 4,218,690 A | 8/1980 | Ulch et al. | 340/825.31 |
| 4,581,634 A | * 4/1986 | Williams | 348/156 |
| 4,714,995 A | 12/1987 | Materna et al. | 707/201 |
| 4,721,954 A | 1/1988 | Mauch | 340/825.31 |
| 4,816,658 A | 3/1989 | Khandwala et al. | 235/382 |

(List continued on next page.)

OTHER PUBLICATIONS

George Heraghty, University Upgrades to High–Tech Access Control, Access Control & Security Systems Integration, Aug. 2001, pp. 1–4.*

*Primary Examiner*—Greta Robinson
(74) *Attorney, Agent, or Firm*—Kenneth J. Lukacher

(57) ABSTRACT

A system for controlling access to areas of one or more buildings by automatically downloading transaction data from an external database to a central database, and distributing security information automatically from the central database to access controllers of the system in response to changes in the central database due to the downloaded transaction data. The transaction data represents changes or additions in employee and/or badge information stored in the external database. Each of the access controllers are coupled to one or more card readers. The card reader read data from badges and any pin number data entered at a keypad of the reader. The access controllers each make access decisions responsive to data from the card reader for controlling locking mechanisms to doors accessing areas of buildings. The system includes a programmed computer server for reading transaction data from the external database, and a central database into which the computer server automatically downloads and maps the read transaction data. When the information downloaded into the central database affects access to areas, the computer server automatically distributes security information from the central database to the access controllers through access control drivers which are each connected to one or more access controllers. Each of the access controllers makes access decisions to areas responsive to data received from the readers coupled to the access controller in accordance with received security information.

50 Claims, 4 Drawing Sheets

U.S. PATENT DOCUMENTS

| | | | |
|---|---|---|---|
| 4,839,640 A | 6/1989 | Ozer et al. | 340/825.31 |
| 4,998,279 A | 3/1991 | Weiss | 713/184 |
| 5,097,505 A | 3/1992 | Weiss | 380/270 |
| 5,210,873 A | 5/1993 | Gay et al. | 709/107 |
| 5,475,378 A | 12/1995 | Kaarsoo et al. | 340/825.34 |
| 5,544,062 A | 8/1996 | Johnston, Jr. | 700/117 |
| RE35,336 E | 9/1996 | Ulch et al. | 340/825.31 |
| 5,566,327 A * | 10/1996 | Sehr | 707/104 |
| 5,614,890 A | 3/1997 | Fox | 340/825.34 |
| 5,629,981 A | 5/1997 | Nerlikar | 713/168 |
| 5,654,696 A | 8/1997 | Barrett et al. | 340/825.31 |
| 5,680,328 A | 10/1997 | Skorupski et al. | 701/35 |
| 5,682,142 A | 10/1997 | Loosmore et al. | 340/572.1 |
| 5,923,264 A * | 7/1999 | Lavelle et al. | 340/825.31 |
| 5,966,715 A * | 10/1999 | Sweeney et al. | 707/203 |
| 6,212,520 B1 * | 4/2001 | Maruyama et al. | 707/10 |

* cited by examiner

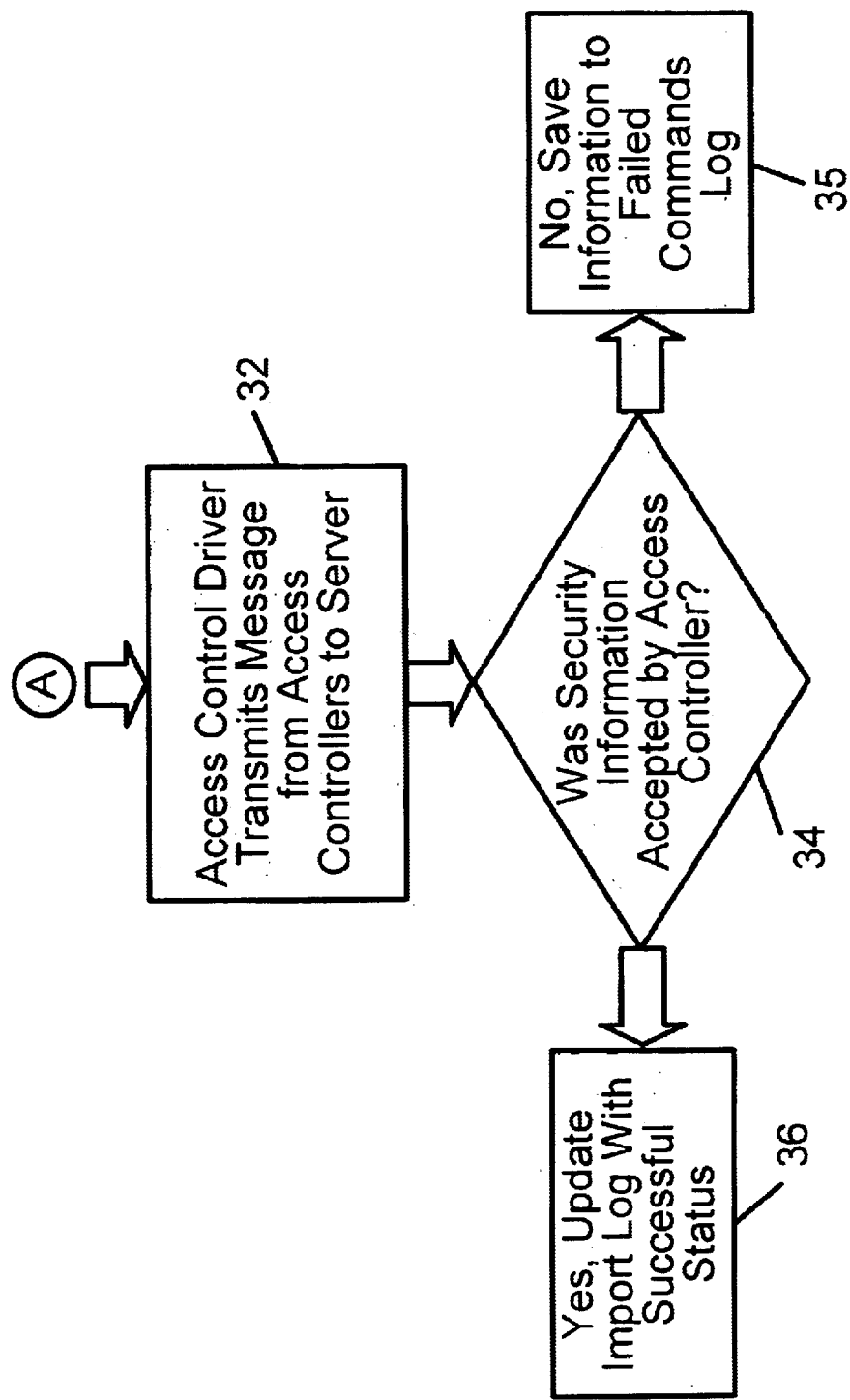

ACCESS CONTROL SYSTEM HAVING AUTOMATIC DOWNLOAD AND DISTRIBUTION OF SECURITY INFORMATION

DESCRIPTION

1. Field of the Invention

The present invention relates to a system (and method) for controlling access to areas in one or more buildings, and particularly to an access control system which automatically downloads information from an external database to a central database, and automatically distributes security information from the central database affecting access to the different parts of the system making access decisions. This invention is especially suitable for automatically downloading employee and/or badge information from an external database maintained by a human resource department of a company which can affect an employee's access to areas of a building.

2. Background of the Invention

Conventional access control systems provide security to areas of a building by utilizing readers associated with locking mechanisms to doors which control entry to such areas. Persons, such as employees, are provided with security badges having data accessible by the reader. Access decisions are made in accordance with security information stored at a central database in response to badge data read from the readers with or without a keypad entered pin number, or access decisions may be made by other databases associated with the readers. Examples of prior access control systems are described in U.S. Pat. Nos. 4,839,640, and 4,218,690.

Separate from each access control system is an external database storing information on employees and/or badges used by such employees. Often such an external database is maintained by the human resources or personnel department of a company, which can modify or create employee information used for badges. Periodically, usually at the end of each work day, a computer program is executed which generates an import file of batched transaction data from the external database having changes in employee information from the past day. Once generated, the import file is manually downloaded into the access control system which accordingly updates the security information stored in its central database. An operator may then manually direct the access control system to update any other databases in the system which can make access decisions.

During the delay between the time the external database is updated and the update of the access control system, an employee is able to use their badge to gain access to areas of a building, even through the employee may have been reassigned or terminated as recorded in the external database. This can lead to unauthorized access to areas, thereby compromising building security. However, to provide more frequent updates of the access control system, such as every few minutes, would be cumbersome and time-consuming since it would require generating multiple import files from the external database and loading such files thorough the day into the access control system, and then manually directing changes in badges to any other databases of the system. Thus, it is desirable to automatically download to an access control system information from an external database, and further to automatically distribute changes affecting access decisions from the central database due to such downloaded information.

SUMMARY OF THE INVENTION

It is an object of the present invention to provide an improved access control system which can automatically download information from an external database to the central database of the access control system.

It is another object of the present invention to provide an improved access control system which can automatically distribute, without manual intervention, security information from a central database to the different parts of the system making access decisions.

It is still another object of the present invention to provide an improved access control system which can send in, a single transmission, security information to multiple access controllers to update the databases of such access controllers.

It is a further object of the present invention to provide an improved access control system which increases the reliability in the delivery of security information to the different parts of the system making access decisions.

Briefly described, the system embodying the present invention automatically downloads transaction data from an external database to a central database and distributes security information automatically from the central database to access controllers of the system in response to changes in or addition to the central database due to the downloaded transaction data from the external database. The transaction data represents changes or additions in employee and/or badge information stored in the external database. The access controllers are each coupled to one or more readers. Each reader reads data from badges and any pin number data entered at a keypad of the reader. The access controllers each make access decisions responsive to access request data from their associated reader(s) for controlling locking mechanisms to doors accessing areas of buildings. The system includes a programmed computer server for reading transaction data from the external database, and a central database storing employee, badge and access level data into which the computer server automatically downloads and maps the read transaction data. Mapping may include changing or assigning information in accordance with the read transaction data, such as access level or badge numbers. The computer server automatically distributes to the access controllers security information, reflecting new or changed data of central database which affects access to the areas, through access control drivers which are each connected to one or more access controllers. Each access control driver formats the security information for receipt by their connected access controllers. Each of the access controllers stores the received security information in a database at the controller, and makes access decisions to areas, responsive to access request data received from the readers coupled to the access controller, in accordance with received security information stored in its database.

Each of the access controllers after receiving the security information from the computer server sends a message, via the access control driver connected to the access controller, to the computer server indicating whether the security information was accepted by the access controller. When the computer server receives a message indicating that the security information was not accepted by the access controller, it stores the security information in a failure log in the central database. The access control driver associated with the access controller periodically resends the security information in the failure log to the access controller which did not accept the security information. The access controller after receiving the resent security information sends a message to the computer server, via the access control driver, indicating whether the resent security information was accepted by the access controller. The computer server upon receiving a message indicating that the resent security information was accepted by the access controller, removes the resent security information from the failure log. Thus, the system increases the reliability that security information sent to the access controllers will be successfully received by the access controllers.

The computer server also can receive an import file having batched transaction data, and download and map each transaction of the batched transmission file into the central database, and then automatically distribute security information responsive to changes in central database affecting access.

BRIEF DESCRIPTION OF THE DRAWINGS

The foregoing objects, features and advantages of the invention will become more apparent from a reading of the following description in connection with the accompanying drawings in which:

FIGS. 2A and 2B are connected flow charts showing the operation of the system of FIG. 1.

DETAILED DESCRIPTION OF THE INVENTION

Figure 1:
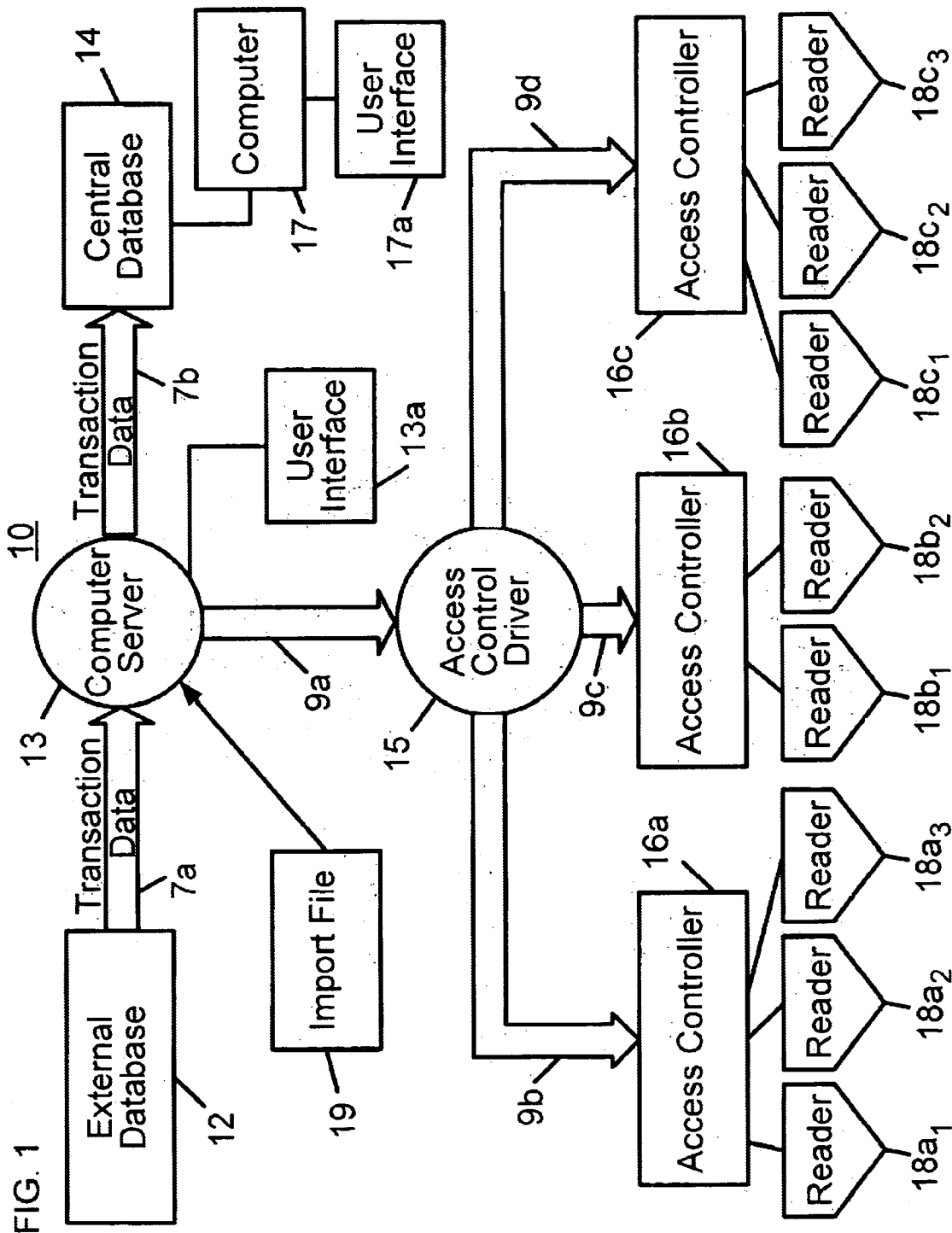
FIG. 1 is a block diagram of the system in accordance with the present invention.

Referring to FIG. 1, a block diagram of access control system 10 of the present invention is shown having a computer system 13 and a central database 14. Computer system 13 represents a programmed computer server which can read and write (store) information to the central database 14. Central database 14 represents memory for storing all information for system 10. Central database 14 may be part of the computer server 13, such as a hard disk drive, or a separate memory storage unit coupled to the computer server.

The computer server 13 can read transaction data stored in an external database 12 having at least employee information. Employee information represents information relevant to all employees, contractors, or any person who may be issued a badge, such as name, site, status, department, phone, employee ID, and the like. The external database may also include, but does not require, badge information. Badge information, represents badge numbers of all badges associated with cards used by employees, contractors, or other persons, to access areas of one or more buildings or sites controlled by the system. External database 12 may be a database of a separate non-security computer system used by the human resource or personnel department of a company for maintaining non-security related employee records and/or management of badges. When the external database 12 includes badge information, this separate computer system can provide for assigning or changing badge numbers for employees in the system. As the human resource department adds or changes employee information in the external database, such as adding a new employee or changing an employee's status (e.g., contractor, retired, regular), or assigns or changes a badge if badge information is included in the external database, transaction data is created recording the event and the transaction data is stored as a record in a table of the external database. For example, transaction data may be created when a new badge is needed for an employee, or when employee information has changed in the external database. The computer server 13 can read the transaction data stored in the table of the external database, and then download the transaction data 7 into central database 14 by mapping the transaction data into records of one or more tables of the central database 14. The transaction data stored in external database 12, and the mapping to the central database 14 will be discussed later in more detail. The external database 12 may be considered art of system 10, or a component separate from the system.

System 10 further includes multiple access controllers 16 which are each coupled to card readers $18a_1$, through $18c_3$. Each access controller can support one to N card readers. For example, N may equal sixty-four. Each card reader $18a_1$, through $18c_3$ may be associated with a locking mechanism to a door which controls entry to or exit from an area of a building. The card readers can read badges, such as RF, optical, barcode, or magnetic strips, to obtain the badge numbers, or other data needed for making security access decisions. The card readers may also have keypads for entry of pin numbers associated with the badges. A database at each access controller 16a through 16c stores multiple records, where each record has a badge number and other associated information for a badge. Each access controller 16a, 16b and 16c makes access decisions responsive to access request data received from its associated readers $18a_1$ through $18c_3$ in accordance with the records of the database of the access controller. Although three access controllers 16a, 16b and 16c are shown in FIG. 1, any number of access controllers may be used. The access controllers 16a, 16b an 16c in the system may be programmable microprocessor-based devices, for example, LNL1000 Access Control Panels manufactured by Lenel Systems International, Inc. of Fairport, N.Y. The readers $18a_1$ through $18c_3$ may be typical readers for obtaining data from badges, and for example, may be LNL1200 Card Readers manufactured by Lenel Systems International, Inc.

The computer server 13 sends security information 9 representing badge and access data to all access controller 16a, 16b and 16c of the system. Each access controller 16a, 16b and 16c can receive such security information after it has been processed (formatted) by an access control driver 15 connected to the access controller. The access control driver 15 may be a program on the computer server 13, or on a separate programmed microprocessor-based computer device, such as a network computer. System 10 may have multiple access control drivers 15 each coupled to a set of one or more of the access controllers 16 of the system. FIG. 1 shows only one access control driver 15 for purposes of illustration. The access controllers 16a, 16b and 16c can also send messages to the computer server 13 though access control drivers 15. Data may pass bidirectionally in the form of data packets between the access controllers 16, access control drivers 15, and computer server 13. Such data packets may have data structures as defined below in connection with FIG. 2A. The computer server 13 may be connected to external database 12, central database 14 and access control driver 15 by wire, PSTN, LAN, WAN or Internet connection, or any combination thereof. Communication interfaces, such as modems, and communication protocols are provided to the components of the system 10 in accordance with the desired communication connection.

System information is also stored in the central database 14 where the system information includes a unique identifier corresponding to each access controller 16 in the system 10 and a unique identifier corresponding to each reader $18a_1$ through $18c_3$ in the system, and which access controllers are associated with which readers. The central database 14 may also be updated via a user interface 13a to the computer server 13, or via one or more other computers, illustrated by computer 17 with user interface 17a, which can read and write to the central database.

Figure 2A:
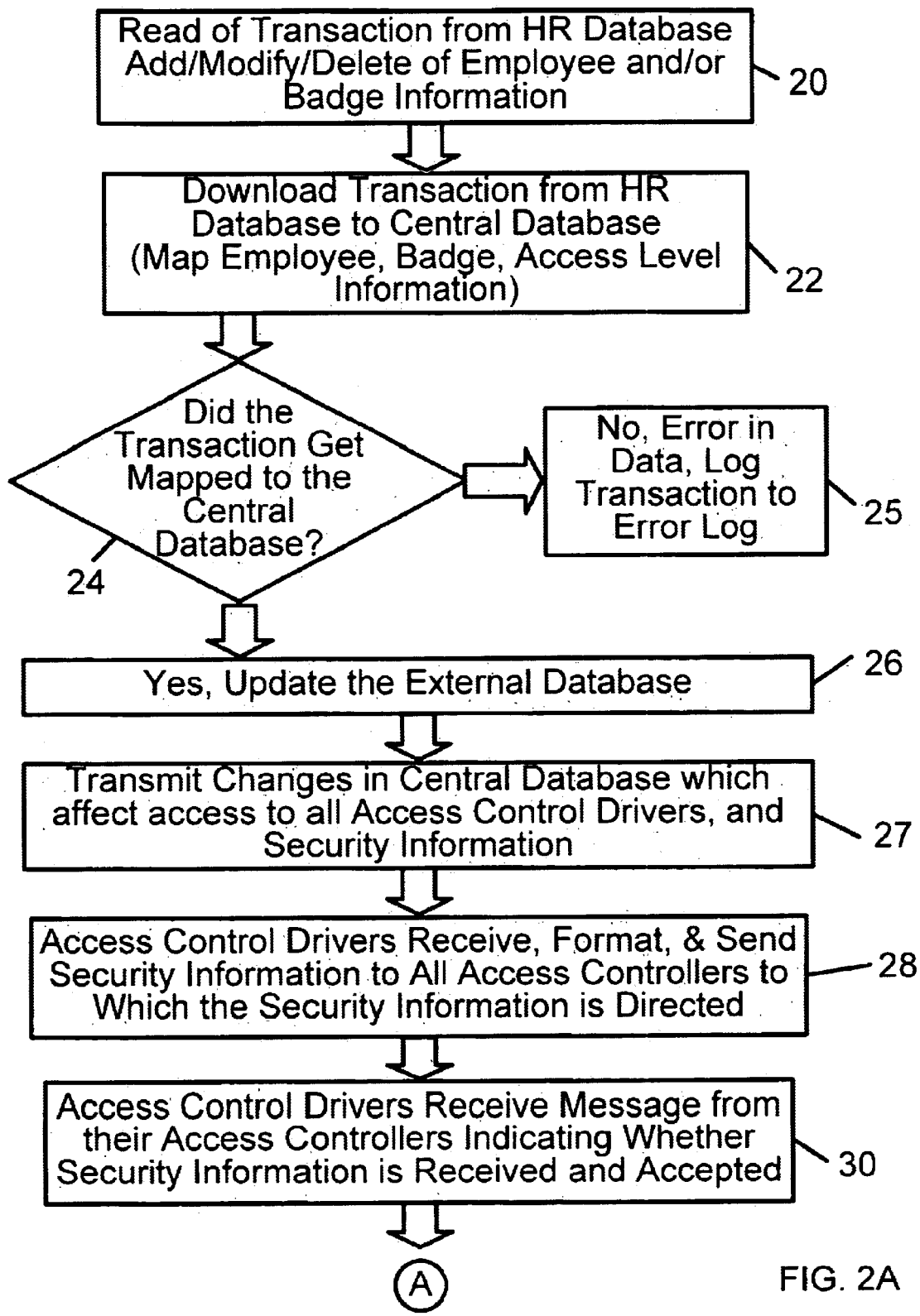

Referring to FIGS. 2A and 2B, a single flow chart of the operation of system 10 is shown in which the figures are connected at circled letter A. The computer server 13 first reads transaction data representing a single transaction from the table of the external database, which is referred to the human resource (HR) database in the figures (step 20). The transaction represents either an addition, modification, or deletion of employee and/or badge information. The computer server 13 automatically reads the external database for any transactions not yet updated to the central database. This read may occur at a predetermined interval set by the user or the system, or may occur each time a transaction is made in the external database 12.

The transaction data for a single transaction stored in the external database may, for example, include the following fields: employee number (EMP_NO), first name of employee (FIRST_NAME), last name of employee (LAST_NAME), middle initial of employee (MIDDLE_INITIAL), employee type (EMP_TYPE), employee's department (DEPT_NAME), manager's name (MGR_NAME), work phone (WORK_PHONE), voice mail number (VOICE_MAIL), site the employee works at (SITE), building the employee works at (BUILDING), contract company if applicable (CONTRACT_COMPANY), termination date if applicable (TERMINATION_DATE), badge number (BadgeNumber), last change date for the badge (Last_Change_Date), image associated with the employee (IMAGE), Employee Status (EMP_STATUS), and Update Status. Other data fields in the transmission data may also be used, such as social security number, or pin number.

The Update Status field is initially set by HR to "0" to indicate that update of the access control system is needed. The Update Status field is changed by the computer server to "1" if the update of the access control system 10 is successful, or "2" if an error occurred in downloading or mapping the transaction to the central database. The computer server 13 uses the Update Status field to determine which transaction data have not been read. The EMP_TYPE field may be a code in which an "E" indicates an Employee, and a "C" indicates a contractor. Other employee types may also be used to differentiate levels of access for employees, such as researcher, or sales. EMP_STATUS may be active, non-active, or one of different types of non-active, such as medical or retired. If EMP_STATUS is non-active, then records for the badge will be deleted from the access controllers. Dates used by the system, such as Last_Change_Date, and TERMINATION DATE, includes date and time of day.

When the transaction data in the table of the external database represents multiple transactions at step 20, the transactions are first sorted by their Last_Changed_Date. The sort is in ascending order so that all changes to the central database occur in chronological order. In other words, the transaction with the oldest Last_Change_Date is downloaded first by the computer server, and then the transaction with the next oldest Last_Change_Date is downloaded, and so on, until all transactions are processed by the computer server.

Next, the transaction data read from the external database is downloaded and mapped for storage in the central database 14 (step 22). The computer server first determines if the employee number, EMP_NO, of the transaction data is present in the central database 14. If so, the last changed date of the transaction data is compared to the Last_Change_Date stored in the employee records in the central database. If the Last_Change_Date of the transaction is greater than the Last_Change_Date stored in the central database, the records for the employee in the central database will be updated, otherwise the records for the employee will not be updated and Update Status of the transaction data is set to "2". If the employee number is not found in the central database, new records for the employee must be added (stored) to the central database 14, as described below.

The central database 14 stores information read from the transaction data for each employee as a record in three related tables, called Employee, Badge, and Access Level Link. The Employee table has fields similar to the transaction data read by the computer server, and has a field having an Employee Table ID (EMPID) assigned by the computer server when each record in the table is first created. If the external database which provided the transaction data does not contain badge information, the BadgeNumber may be automatically assigned by the computer server. The Employee table need not include the BadgeNumber, since this is recorded in other tables.

The Badge table has fields which include: an ID (set equal to the BadgeNumber); EMPID (the identifier assigned to the Employee Table); BADGETYPE (e.g., set equal to EMP_TYPE); ACTIVATE (e.g., set equal to Last_Change_Date, or the date the badge was first created); DEACTIVATE (set equal to the TERMINATION DATE, or if null, a default deactivation date for the BADGETYPE, such as Last_Change_Date plus five years); STATUS (set equal to EMP_STATUS); ISSUECODE; and PINNUMBER. ISSUECODE is set to a value greater than one when a badge is reissued for the same BadgeNumber. For example, if a badge has been issued twice for the same BadgeNumber, ISSUECODE is set to two. PINNUMBER is a number which may be needed for entry on a keypad by certain reader in the system. PINNUMBER may be a data field of the transaction data from the external database, or may be entered in the Badge table via user interfaces 13a or 17a.

The Access Level Link table has the fields ID (set equal to BadgeNumber) and ACCLVID. ACCLVID represents an identifier in an Access Level table, which determines the access privileges for the badge. This identifier is called an access level, and may be a value, such as 1 to 5. Although access level is referred to as a numeral, it may be translated into a descriptive name by user interface 13a or 17a. For each access level (i.e., ACCLVID), the Access Level table has an array of all the readers in the system which may grant access in specified time zones under the BadgeNumber. For example, a reader in this array may be specified by its identifier having a time zone "3" representing 9PM to 5PM in which access may be granted. The access level(s) for each badge are automatically assigned by the computer server 13 as part of the mapping of transaction data creating a new badge for an employee in the central database. For example, the access level may be automatically assigned by the computer server based on BADGETYPE, department, site, building, contract company, or other parameters, or may be set by an additional access level field in the transaction data downloaded from the external database when the badge information in the external database includes access level information. Employees may have greater or more restricted access to areas of the buildings as determined by their access level(s) of the badge each employee uses. Access level may be reassigned in accordance with the mapping of other transaction data affecting the badge of an employee in the central database. Access levels in the records of an Access Level Link table can be reassigned via user interfaces 13a or 17a.

Each employee has a single record in the Employee table (called hereinafter a Employee record), but an employee may have one or more badges. Thus, for each badge a different record in the Badge table (called hereinafter a Badge record) is produced, in which each Badge record is linked by EMPID to the Employee record. Further, each badge has different Access Level Link record(s).

When the transaction read by the computer server 13 has an EMP_NO of an existing Employee record, the computer server 13 can read the EMP_NO value to locate the associated BadgeNumber in the ID fields of the Badge record. Further, computer server 13 can use the located BadgeNumber value in the ID fields of the Access Level Link records to locate an Access Level Link record.

At step 24, the computer server 13 checks if the transaction data was mapped successfully to the central database 14. If so, the Update Status of the transaction stored in the external database 12 is changed to "1" (step 26), otherwise, an error is present in the transaction data, and the transaction data is logged in an error log of the central database.

If the central database 14 has successfully downloaded and mapped the read transaction, the computer server 13 next distributes to each of the access controller 16, through their connected access control drivers 15, security information from the central database 14 (step 27). This occurs when any record of the tables updated or added at the central database affects access decisions in the system (step 27). For example, a change in employee type or status may effect an access decision of a access controller 16, but a change in the employee's name or work phone would not. The security information may be sent in a data packet (illustrated below for example in C++ language) having the following data structure:

```
typedef struct _BADGE
{
    long    si_PanelID;
    long    si_SegmentID;
    long    sb_NumPanelsInArray;
    long    sb_PanelArray[MAX_PANELS_SERVER];
    DWORD   sl_CardNumber;
    BYTE    sb_IssueCode;
    BYTE    sb_PIN[MAX_PIN_DIGITS];
    LNLDATE ss_ActivationDate;
    LNLDATE ss_DeactivationDate;
    long    sl_AccessLevels[MAX_ACCLEVELS_CARDHOLDER];
}BADGE;
```

When the security information is to be sent to a single access controller, PanelID represents the identifier for the access controller which is to receive the security information. Security information may also be sent to multiple assess controllers. SegmentID represents an identifier representing a group of multiple assess controllers. The access controllers may be grouped by site, building, geographic region, department, or other designated segment of the system. NumPanelsInArray is the number of access controllers connected to the particular driver to receive the security information. When NumPanelsInArray has a value, the PanelID is set to "−1" and the identifiers of all the access controllers to receive the security information are listed under PanelArray[MAX_PANELS_SERVER]. Thus, when the same information is being sent to multiple access controllers, the computer server uses NumPanelsInArray, and PanelArray[MAX_PANELS_SERVER] to enable parallel updates of multiple controllers, allowing security information to be distributed faster than if the security information were directed to each access controller separately.

CardNumber is set to the ID of the Badge table, i.e., BadgeNumber. IssueCode is set to the ISSUECODE in the Badge table. PIN[MAX_PIN_DIGITS] is set to the PINNUMBER in the Badge table. ActivationDate and DeactivationDate is set to ACTIVATE and DEACTIVATE from the Badge table, respectively. AccessLevels[MAX_ACCLEVELS_CARDHOLDER] is set to the array of the Access Level Table specified by ACCLVID of the Access Level Link table. In the data structure used to transmit the security information CardNumber, IssueCode, PIN[MAX_PIN_DIGITS], ActivationDate, DeactivationDate, and AccessLevels[MAX_ACCLEVELS_CARDHOLDER] are considered the security information, while the remaining part of the Badge data structure may be considered addressing information for directing transmissions of security information to one or more access controllers.

If any access controller does not require the security information, since none of the readers connected to the access controller will grant access under the badge, the computer server need not send such security information to that access controller. Depending on the communication link between the computer server and each of the access control drivers, each driver may have an address which is used by the computer server for routing the data packet containing the security information to the driver.

When each access control driver 15 receives the security information from the computer server 13 which is directed to one or more of the access controllers 16 connected to the driver, the driver formats the security information for receipt by the access controller, and sends the formatted security information to the access controller (step 28). The following data structure may be, for example, used to transmit the security information by an access control driver 15 to an access controller 16 connected to the access control driver:

```
typedef struct
{   IntVB   scp_number;
    IntVB   flags;
    long    card_number;
    IntVB   issue_code;
    char    pin[8+1];
    IntVB   alvl[MAX_ALVL_EXTD];
    IntVB   act_date;
    IntVB   dact_date;
} CC_ADBC_RECORD32;
```

In this data structure, scp_number is the identifier of the access controller; flags include a flag indicating if the badge is still active; card_number is the BadgeNumber; issue_code is the issue code; pin is the pin number; alvl[MAX_ALVL_EXTD] is an array equal to AccessLevels[MAX_ACCLEVELS_CARDHOLDER]; act_date is the activation date; and dact_date is the deactivation date. This security information received by the access controller is stored as fields of a record in the database of the access controller. If the security information received has a card_number identical to the card_number of a record which exists in the database, the new security information is stored and the existing record is removed from the database.

The security information received by the access controller 16 includes sufficient information for the access controller to make entry decisions for the badge in response to access request data from any one of the readers connected to the access controller. The access controller in response to receiving access request data from a reader connected to the controller, such request data including a badge number, issue code, and pin number, checks its database for any records having fields matching these numbers, and will grant access to through the door lock associated with the reader if the badge is active and access level array include the identifier for reader originating the access request data for the given timezone the access request was received, otherwise access is denied. If the reader originating the request has no keypad for pin number entry, then the pin number of the record is not used.

Another data structure may be used by the computer server for sending security information directing an access controller to delete a record in its database for a particular badge, such as the following:

```
        type struct __GENERIC__CMD
{
        int      si__PanelID:
        long     si__SegmentID;
        BYTE     sb__NmPanelsInArray;
        BYTE     sb__PanelArray[MAX__PANELS__SERVER];
        int      si__ID;
}GENERIC__CMD;
```

Responsive to receiving this command, the access control driver 15 directs any of the access controller specified by the PanelID, SegmentID, NmPanelsInArray, and sb__PanelArray[MAX__PANELS__SERVER] which are connected to the driver to delete the record in the database of the access controller having ID (i.e., BadgeNumber). This may be achieved by the access control driver sending a delete command to the access controller with the Badge-Number of the record in the controller to be deleted.

If the security information has been successfully stored as a record in the database of the access controller, the access controller sends an acknowledge message to the computer server 13, via its associated access control driver 15, indicating whether the security information has been accepted (steps 30 and 32). The acknowledge message may be a boolean variable set to yes or no, and may include information for identifying the access controller sending the message. The computer server 13 receives the acknowledge message and checks if it indicates that the security information was accepted by the access controller (step 34). If not, the security information which was sent by the computer server to the access control driver is stored in a failed command log at the central database with the time the acknowledge message was received under the identifier for that access controller (step 35), otherwise, an import log at the central database is updated with a successful status under the identifier for the access controller (step 36). The stored security information in the failed command log is referred to herein as a failed command.

Figure 3:
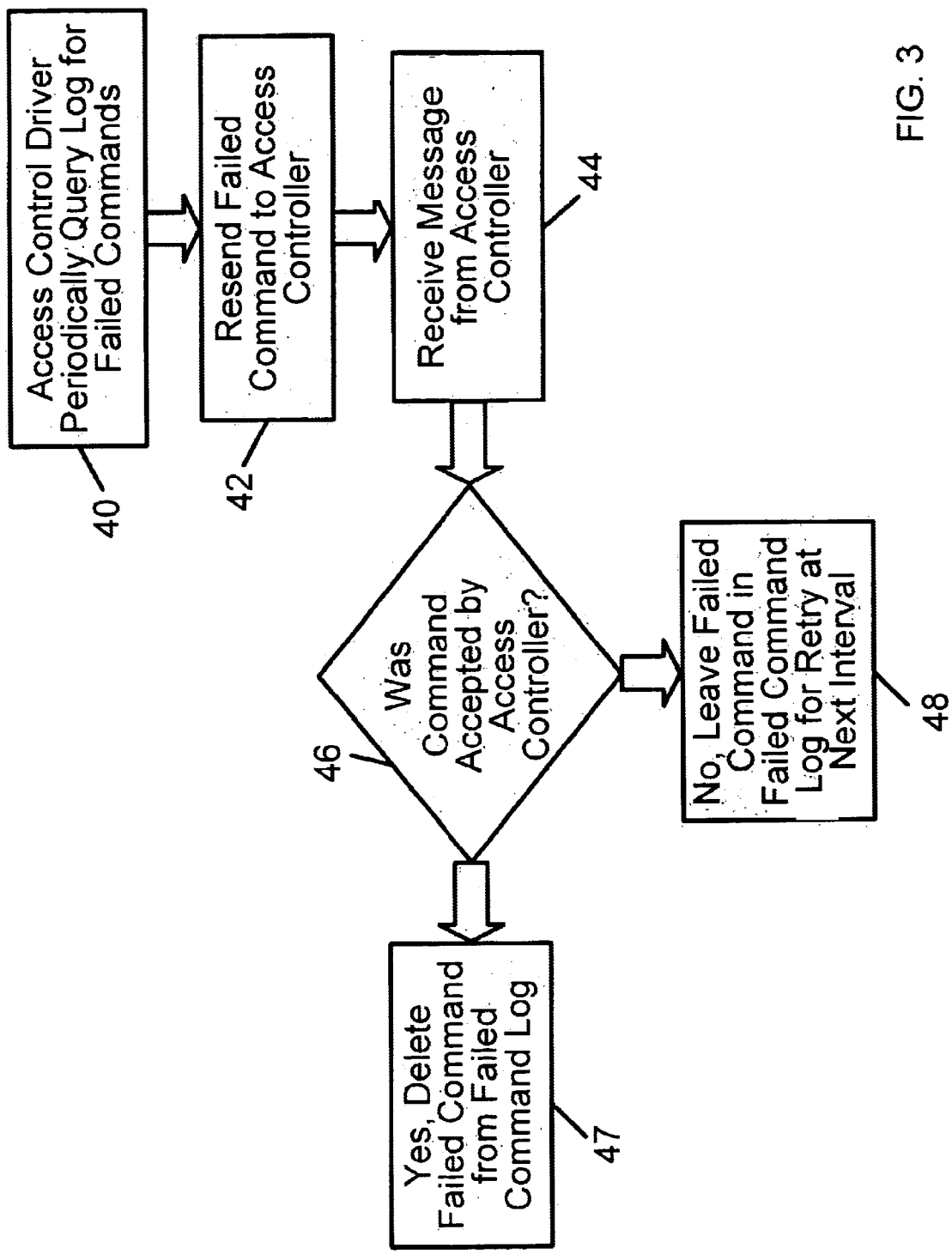
FIG. 3 is a flow chart showing the operation of the system of FIG. 1 for resending security information not successfully received by an access controller of FIG. 1.

Referring to FIG. 3, access control driver 15 periodically queries (reads) the failure command log through the computer server 13 for any failed commands for each of the access controllers connected to the driver (step 40). If any failed commands are present, the driver resends that failed command in the failure command log to the access controller (step 42). The access controller responds to the access control driver, with an acknowledge message as to whether the security information was accepted, such as described earlier. The driver upon receiving this acknowledge message (step 46), checks whether the security information was accepted by the access controller. If so, then that security information resent is deleted from the failed command log (step 47), otherwise, the failed command log is left unchanged. If more than one failed command is present in the failed command log, each command is processed in the above manner in chronological order based upon the time stored in the log entry. After an attempt to resend each failed command in the failed command log, any failed commands still present will be retried again at the next periodic interval. The period may be every one minute, but other time intervals may be used.

Further, system 10 can also accept an import file 19 (FIG. 1) having batched transaction data representing a single or more multiple transactions. Such an import file is typically generated in the external human resource database for prior art access control systems, such as those manufactured by Casi Rusco, ADT, or Software House. The system 10 stores and maps each transaction of the batched transaction data to the central database, and then automatically distributes security information to access controllers as described earlier. This provides the flexibility of enabling the system to download manually to the central database, or to download automatically to the central database in the manner described earlier. The later being preferred since it reduces the delay from the time a change is made in the external database affecting access of a badge, to that change being passed to the central database. Batch transactions can also be automatically performed on a schedule. Moreover, until storage of a change in, or addition of, a badge is present in the central database, automatic distribution of security information in response to that change to each affected access controller is delayed.

The data structures shown above are exemplary, other data structures with different security information may be used so long as security information is distributed to each of the access controllers of the system which are affected by changes in the central database. Further, each of the data structures used herein in passing security information may be divided into multiple data structures depending on desired data structure organization.

The security information obtained from the transaction data downloaded to the central database and distributed to access controllers may include other types of information, such as, for example, vacation start date and number of vacation days, a handicap parameter allowing a door to open for a longer period upon each access grant, anti-pass parameters to assure entry and exit from an area within a given time period, the number of valid access grants available for a badge, or user levels to enable commands to be entered at a reader from a keypad, if present. The particular security information distributed depends on the needs of the system and the programming of the access controllers to respond to parameters received from the computer server. Accordingly, the security information disclosed in the above data structures are examples of the types of security information which may be downloaded and distributed.

From the foregoing description, it will be apparent that an improved access control system which can automatically download and distribute security information has been provided. Variations and modifications of the herein described system and other applications for the invention will undoubtedly suggest themselves to those skilled in the art. Accordingly, the foregoing description should be taken as illustrative and not in a limiting sense.

What is claimed is:

1. A system for controlling access to areas of one or more buildings using readers associated with said areas for obtaining access requests to said areas, said system being coupled for communication to a non-security computer system, said system comprising:

a plurality of controllers for controlling access to said areas in which each of said controllers has a database and controls access in accordance with information in the database of the controller responsive to access requests from at least one reader associated with the controller, and one or more of said controllers are capable of being coupled to a plurality of readers;

a central database for storing at least non-security information about the personnel having access to said areas, and security information for said personnel defining their access to said areas, in which the database in each of said controllers is used independent of the central database in responding to access requests;

an external database of said non-security computer storing at least non-security information about the personnel having access to said areas; and a security computer system coupled to said external database, said central database, and to said controllers, which automatically downloads to said central database additions or changes in said non-security information stored in said external database, and automatically, transmits from said central database to one or more of said controllers such parts of said security information affecting access to said areas which is new or changed in said central database in accordance with said downloaded non-security information.

2. The system according to claim 1 wherein said security computer system downloads additions or changes in information stored in the external database by automatically reading from said external database transaction data characterizing the added or changed non-security information of the external database and downloading said read transaction data into said central database.

3. The system according to claim 2 wherein said security computer system automatically transmits said security information to said controllers after said security computer system has verified that said central database has successfully downloaded the transaction data read from said external database.

4. The system according to claim 2 wherein said security computer system comprises means for downloading said transaction data into said central database by mapping said transaction data as records in one or more tables storing said non-security and said security information.

5. The system according to claim 1 further comprising at least one driver connecting said security computer system to a set of one or more of said controllers in which said driver receives said security information transmitted by said security computer system and sends said received security information to one or more of said controllers connected to said driver.

6. The system according to claim 5 wherein each of said controllers controls access to one or more of said areas in accordance with said security information received from said driver connected to the controller.

7. The system according to claim 5 wherein said security computer system directs transmitted security information in a single transmission to any one of said controllers connected to said driver or to multiple ones of said controllers connected to said driver.

8. The system according to claim 7 wherein said driver comprises means for formatting said security information received from said security computer system for receipt by at least one of the controllers connected the driver to which said security information is directed.

9. The system according to claim 1 wherein each of said controllers stores said security information transmitted by said security computer system in the database of the controller.

10. The system according to claim 1 further comprising means for communication between said controllers and said security computer system.

11. The system according to claim 1 further comprising at each of said controllers means for receiving and accepting said security information transmitted from said security computer system.

12. The system according to claim 11 further comprising means for determining when each of said controllers has received and accepted said security information transmitted by said security computer system.

13. The system according to claim 12 further comprising means, when said determining means has determined that one of said controllers did not receive and accept said security information transmitted by said security computer system to the controller, for storing said security information sent to said one controller as a failed command in said central database.

14. The system according to claim 13 further comprising means for automatically resending said failed command from said central database to the controller associated with said failed command.

15. The system according to claim 14 wherein said determining means further comprises means for determining when the resent failed command was received and accepted by the controller associated with the failed command, and said system further comprises means for removing the resent failed command from said central database when the resent failed command is received and accepted by the controller.

16. The system according to claim 1 wherein said central database is part of said security computer system.

17. The system according to claim 1 wherein said security computer system is a computer server.

18. The system according to claim 1 wherein said security information stored in said central database comprises badge and access information, and said non-security information comprises employee information.

19. The system according to claim 1 wherein said security information transmitted by said security computer system comprises a badge number for a badge, and readers of the system associated with the areas accessible under the badge number.

20. The system according to claim 1 wherein said security computer system receives an import file having transaction data and downloads said transaction data into said central database.

21. A method for controlling access to areas of one or more buildings, said method comprising the steps of:

storing in a central database at least badge and access information for the badges used by employees to access one or more areas;

automatically transmitting security information from a computer system to one or more access controllers when any new or changed information in said central database affects access to said areas;

receiving said security information at said access controllers;

storing said security information in a database at each of said access controllers;

controlling access responsive to data received from one or more readers associated with each of the access controllers in accordance with the security information stored in the database at the access controller independent of said central database;

providing an external database having transaction data comprising non-security information;

reading from said external database said transaction data with the aid of said computer system; and downloading said transaction data into said central database, wherein said downloaded transaction data can change or add badge and access information in said central database.

22. The method according to claim 21 wherein said automatically transmitting step further comprises the step of transmitting said security information to said access controllers after verifying that said central database has successfully downloaded said transaction data from said external database.

23. The method according to claim 21 further comprising the step of downloading said transaction data into said central database by mapping said transaction data into one or more tables of the central database.

24. The method according to claim 21 further comprising the step of connecting said computer system to a set of one or more of said access controllers with at least one driver in which said driver receives said security information transmitted by said computer system and sends said received security information to one or more of said controllers connected to said driver.

25. The method according to claim 24 further comprising the step of controlling access to one or more of said areas using each of said controllers in accordance with said security information received from said driver connected to the controller.

26. The method according to claim 24 further comprising the step of directing transmitted security information in a single transmission to any one of said controllers connected to said driver or to multiple ones of said controllers connected to said driver.

27. The method according to claim 26 further comprising the step of formatting said security information received from said computer system with the aid of said driver for receipt by at least one of the access controllers connected the driver to which said security information is directed.

28. The method according to claim 21 further comprising the step of receiving and accepting said security information transmitted from said computer system at each of said access controllers.

29. The method according to claim 28 further comprising the step of determining when each of said controllers has received and accepted said security information transmitted by said computer system.

30. The method according to claim 29 further comprising the step of storing said security information sent to said one controller as a failed command in said central database, when said determining step has determined that one of said controllers did not receive and accept said security information transmitted by said computer system to the access controller.

31. The method according to claim 30 further comprising the step of resending said failed command from said central database to the access controller associated with said failed command.

32. The method according to claim 31 further comprising the steps of:

determining when the resent failed command was received and accepted by the access controller associated with the failed command; and removing the resent failed command from said central database when the resent failed command is received and accepted by the access controller.

33. The method according to claim 21 wherein said transmitting step transmits said security information in multiple transmissions, each of said transmissions being directed to one or multiple ones of said controllers.

34. The method according to claim 21 wherein said security information stored in said central database comprises said badge and access information.

35. The method according to claim 21 wherein said transmitted security information represents at least a badge number for a badge, and readers associated with the areas accessible under the badge number.

36. The method according to claim 21 further comprising the steps of receiving an import file having transaction data representing changes in said non-security information, and downloading said transaction data into said central database, wherein said downloaded transaction data downloaded into said central database changes said central database.

37. A system for controlling access to areas of one or more buildings which automatically downloads information to said system from an external database of a non-security based computer system and automatically distributes security information to said access controllers in which the access controllers make access decisions to said areas, said system comprising:

a computer system for reading employee information from said external database of said non-security based computer system;

a central database in which said computer system automatically downloads and maps said information read from said external database to said central database; and said computer system having means for automatically distributing security information to one or more of said access controllers responsive to changes in said central database due to said information downloaded to said central database.

38. The system according to claim 37 further comprising one or more access control drivers in which said computer system sends said security information to the access controllers through said access control drivers, in which each of said access control drivers are connected to at least one of said access controllers.

39. The system according to claim 37 further comprising means for resending security information to any one of said access controllers which did not receive and accept said security information.

40. A system for controlling access to areas of one or more buildings using readers associated with said areas for obtaining access requests to said areas, said system comprising:

a plurality of controllers each capable of controlling access responsive to access requests from a plurality of readers;

a computer system for transmitting security information for one or more of said controllers; and at least one driver connected to a group of two or more of said controllers in which said driver receives said security information from said computer system and sends said received security information to one or more of said controllers connected to said driver, wherein said controller control access to said areas responsive to said access requests in accordance with said security information received from said driver.

41. The system according to claim 1 wherein said external database further comprises information defining badges used by said personnel at said readers.

42. The system according to claim 1 wherein said personnel represent employees or other persons having access to said areas.

43. The system according to claim 40 wherein said driver comprises software means for enabling communication between the computer system and the controllers connected with said driver.

44. The system according to claim 1 further comprising said non-security computer system coupled to said external database.

45. The system according to claim 41 wherein said security computer further automatically downloads to said central database additions or changes in badge information stored in said external database, and automatically transmits from said central database to one or more of said controllers such parts of said security information affecting access to said areas which is new or changed in said central database in accordance with said downloaded badge information.

46. The system according to claim 1 wherein said external database further comprises information for managing badges.

47. The method according to claim 21 wherein said external database further comprises information defining badges used by said personnel at said readers.

48. The method according to claim 47 wherein said downloading step further comprises the step of downloading said transaction data having non-security information and badge information into said central data, wherein one of said downloaded non-security information, said downloaded badge information, or said downloaded non-security information and badge information, can change or add badge and access information in said central database.

49. A system for controlling access to areas of one or more buildings using at least one access controller coupled to one or more readers, said system comprising:

a non-security computer system having a first database storing at least non-security information about the personnel having access to said areas;

a security computer system having a second database storing at least non-security information about the personnel having access to said areas, and security information for said personnel to access said areas;

means for downloading from said first database to said second database additions or changes in non-security information stored in said first database; and means for transmitting from said second database to at least one access controller such parts of said security information affecting access to said areas which is new or changed in said second database in accordance with said downloaded non-security information.

50. A method for controlling access to areas of one or more buildings using at least one access controller coupled to one or more readers, a non-security computer system having a first database storing at least non-security information about the personnel having access to said areas, and a security computer system having a second database storing at least non-security information about the personnel having access to said areas, and security information for said personnel to access said areas, said method comprising the steps of:

downloading from said first database to said second database additions or changes in non-security information stored in said first database; and transmitting from said second database to at least one access controller such security information affecting access to said areas which is new or changed in said second database in accordance with said downloaded non-security information.

* * * * *